May 7, 1929.  W. C. BLEHER ET AL  1,711,556
TUBE WRAPPING LATHE
Filed May 26, 1927   6 Sheets-Sheet 1

Fig. 1.

Inventor
William C. Bleher
Frank E. Willis
Roland A. Wentworth

By Spear Middleton Donaldson & Hall
Attorneys

Patented May 7, 1929.

1,711,556

UNITED STATES PATENT OFFICE.

WILLIAM C. BLEHER, FRANK E. WILLIS, AND ROLAND A. WENTWORTH, OF WATERTOWN, MASSACHUSETTS, ASSIGNORS TO HOOD RUBBER COMPANY, OF WATERTOWN, MASSACHUSETTS, A CORPORATION OF MASSACHUSETTS.

TUBE-WRAPPING LATHE.

Application filed May 26, 1927. Serial No. 194,330.

Our said invention relates to improved means for holding and rotating poles or mandrels carrying uncured rubber tubes for the purpose of having applied thereto a fabric wrapping, and also to means incorporated therewith for automatically supplying and removing the mandrels.

The invention aims to provide a simple economical and efficient form of apparatus which will selectively and successively present the mandrels to wrapping position, rotate them while in such position, and discharge the wrapped mandrel, with a minimum of operator's attention, and without danger of damage to the uncured tube.

With these and other objects in view, which will be apparent from the following description, the invention includes the novel features of construction and arrangement and combination of parts hereinafter described, the nature and scope of the said invention being defined by the claims appended hereto.

What we at present consider the preferred embodiment of the invention is illustrated in the accompanying drawings in which:—

Figure 1:
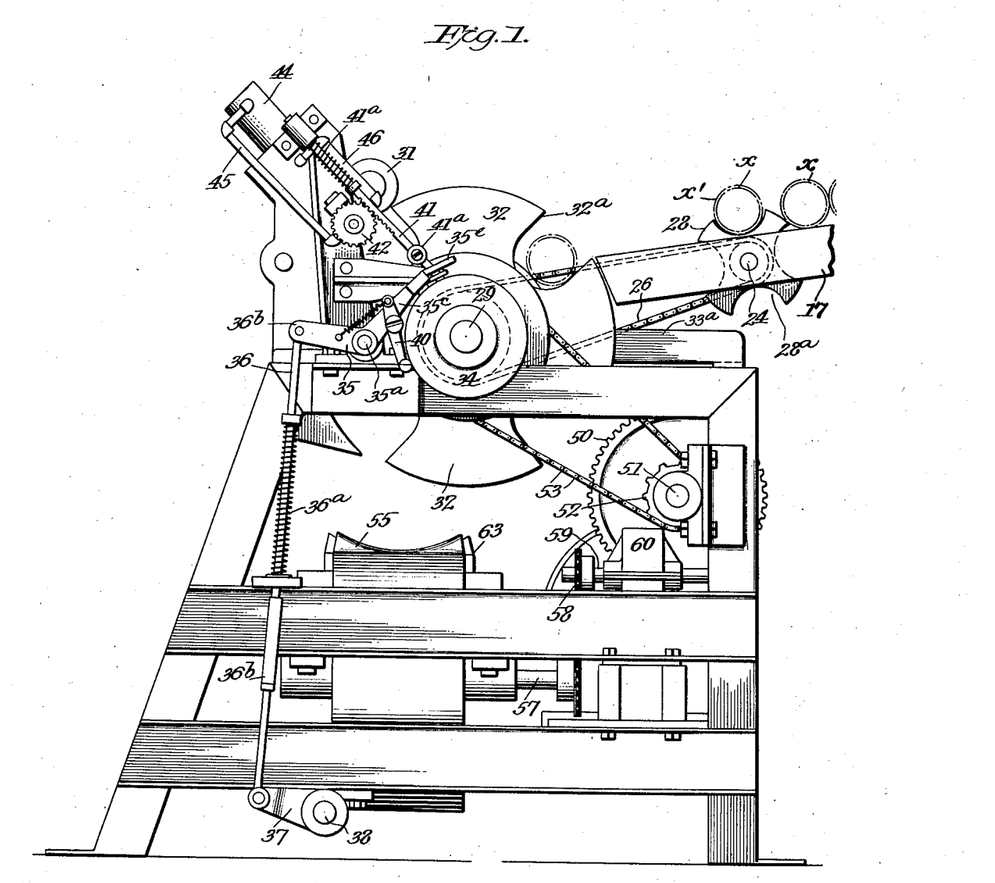
Fig. 1 is an end view of the machine or apparatus.
Figure 5:
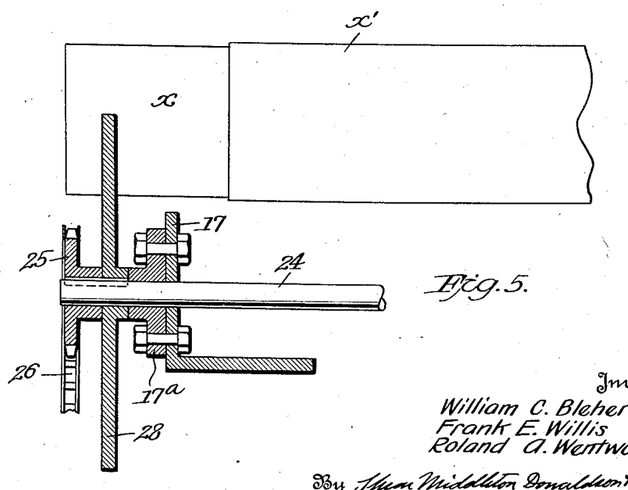
Fig. 5 is a detail view of the mandrel selector or separator showing the manner of mounting and operating the same.
Figure 6:
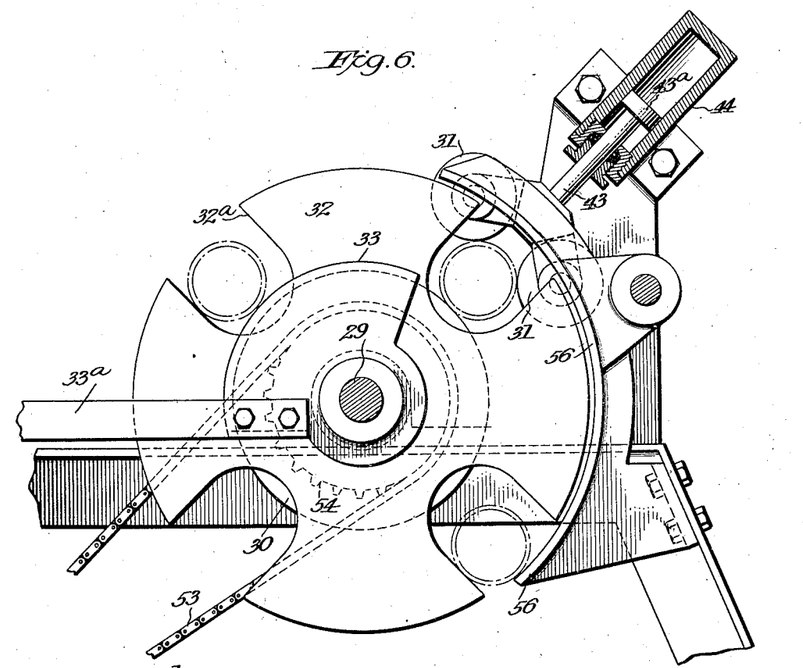
Fig. 6 is a sectional elevation of the parts shown in Fig. 4 as viewed from above.

The apparatus herein described is intended to selectively feed the mandrels from a gravity supply table or support to which they are automatically conveyed by apparatus which forms the subject of an application filed by us on the 12th day of July, 1927, Serial Number 205,110. Such table is indicated at 17, Figs. 1 and 5, and comprises downwardly inclined supports 17 preferably in the shape of angle bars having the upper edges of their vertical webs positioned to receive the uncovered ends of the mandrels $x$, the rubber tube thereon being indicated at $x'$.

A shaft 24 is journaled in suitable bearings $17^a$ carried by the angle bars 17 and carries at one end a sprocket 25, driven by chain 26 from a sprocket 27 on the main shaft 29 of the "lathe" which is intermittently rotated as hereinafter described.

This shaft 24 carries a pair of separating and feeding members in the shape of discs 28 having mandrel receiving recesses $28^a$ and intervening intact portions or arms. As the mandrels roll down the inclined supports 17 they will encounter the members 28 and be retained thereby until in the rotation of the discs, the uncovered ends of the front mandrel will enter a pair of recesses $28^a$ and be conveyed therewith to the opposite side of the separators whence they will be free to roll down the remaining portions of the supporting rails 17 to the lathe feeding mechanism hereinafter described. As one mandrel is thus being conveyed the remaining mandrels back of the members 28 will be retained or held back by the next succeeding pair of arms until another pair of recesses picks out the next succeeding mandrel.

After leaving the separator the mandrels roll down the inclined supports 17 to the lathe mechanism to which they are successively supplied.

This lathe comprises continuously driven friction wheels 30 for supporting and rotating the mandrel driven, and presser rolls 31 for holding the mandrel against the friction wheels while being rotated, all as hereinafter described.

In order to feed the mandrels successively from the termini of the rails 17 to mandrel rotating position and hold them out of contact with the friction wheels during such feed, we provide the following means: Fast on the shaft at each side of the machine and adjacent the friction wheels 30 which are loose on the shaft, is a disc 32 having mandrel and receiving recesses 32ª arranged in the embodiment shown at 90° apart. Means are provided for successively imparting to the discs a movement through an arc of 90° so that the recesses will be successively brought into mandrel receiving position as indicated at F and thence moved to mandrel rotating position indicated at G.

Figure 4:
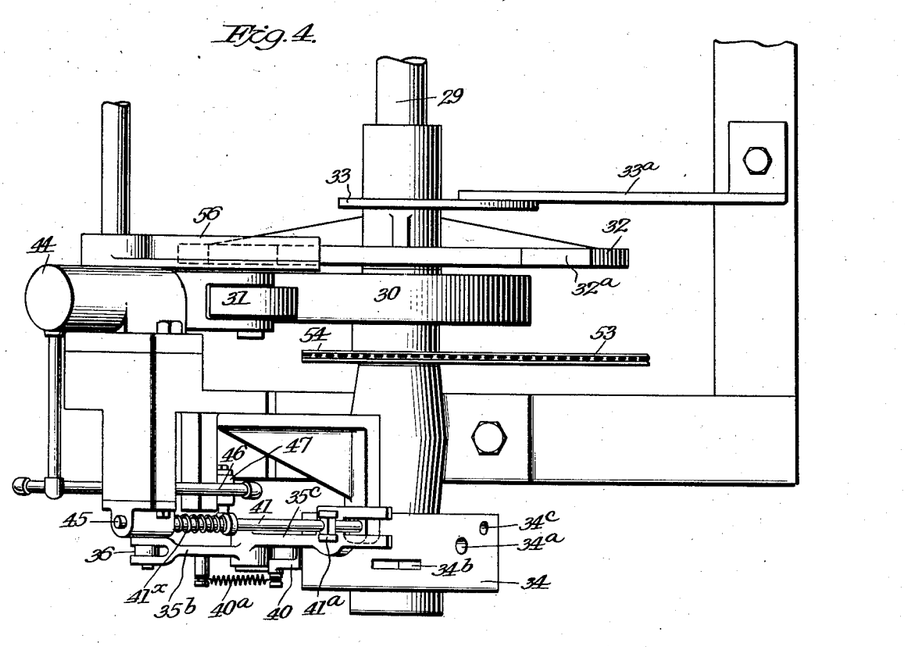
Fig. 4 is a detail plan view of the mechanism shown in the upper part of Fig. 3 with parts omitted for clearness of illustration and on a somewhat smaller scale.

To hold the mandrels out of contact with the friction discs while they are moving from the first of these positions to the second we provide guide 33 upon the peripheries of which the uncovered mandrel ends slide or roll, these guides being held against rotation by the bracket members 33ª fast to the frame of the machine (see Fig. 4). On reaching the position G the mandrel ends clear the ends of the guides and can be moved inward into contact with the friction drive wheels 30 under the influence of the presser rollers 31.

Figure 3:
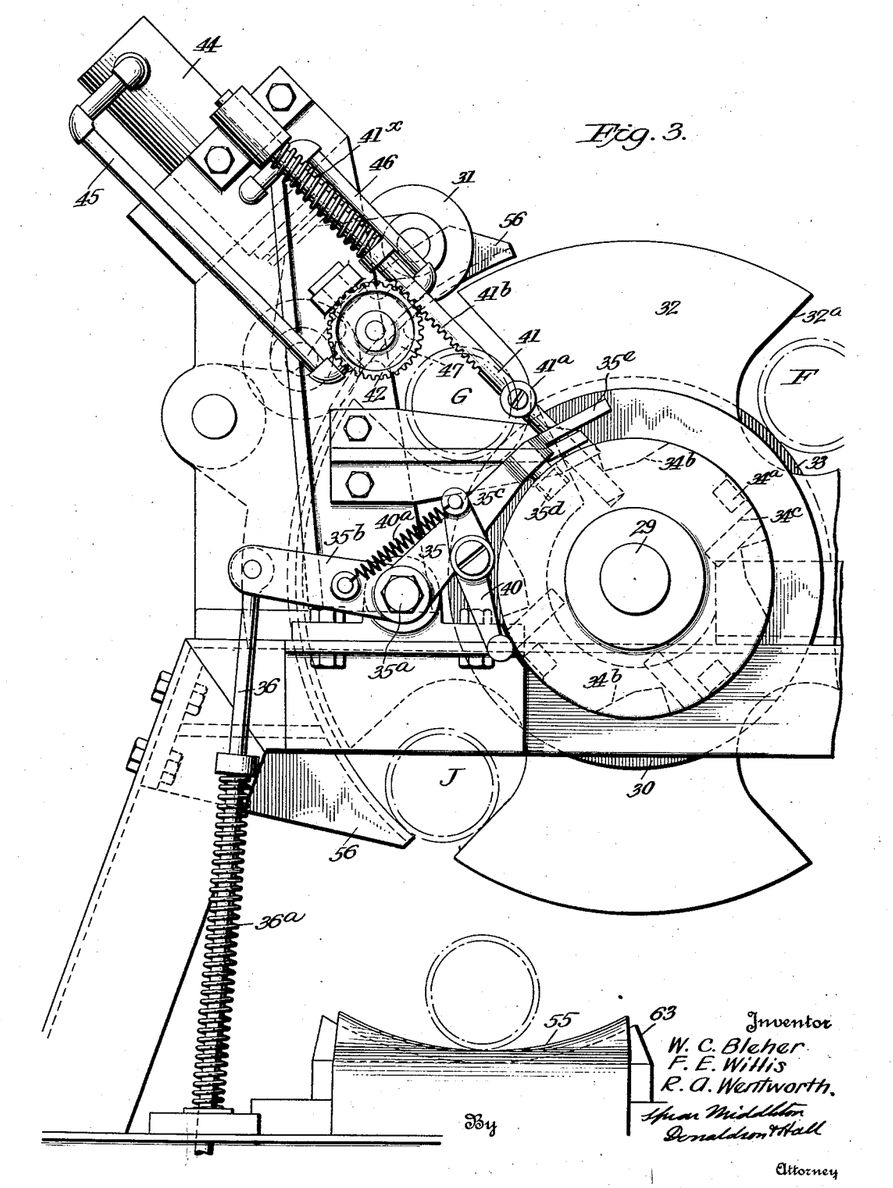
Fig. 3 is a view similar to Fig. 1, but on a larger scale and partly broken away.

For intermittently moving the shaft 29, discs 32 and presser rollers we provide the following means. At each end of the shaft 29 is keyed a disc 34 which has a plurality of locking dog receiving recesses 34ª and pawl receiving recesses 34ᵇ arranged respectively at 90° apart, and a third series of relatively deep recesses 34ᶜ similarly spaced. A bell crank lever 35 fulcrumed on a fixed pivot 35ª has one arm 35ᵇ connected by rod 36 with an arm 37 fast on rock shaft 38 provided with a foot pedal or treadle lever 39. Rod 36 is normally yieldingly held elevated by spring means such as helical spring 36ª encircling the rod between a collar thereon and a fixed abutment on the frame, through an opening in which the rod passes as shown in Fig. 3.

Said rod is preferably formed in two parts connected by a turnbuckle 36ᵇ for purposes of adjustment.

The arm 35ᶜ of bell crank 35 carries adjacent its free end a locking dog 35ᵈ designed to engage the recesses 34ª and has also pivoted thereto a pawl 40, one end of which carries a rounded end or roller adapted to ride on the periphery of the disc and drop into the ratchet recesses 34ᵇ while the other end is under the tension of spring 40ª.

The free end of the arm 35ᶜ is forked as at 35ᵉ to straddle slidable rod or bar 41 and engage, when raised, with roller abutment means 41ª thereon, the lower end of said rod or bar 41 being adapted to enter the recesses 34ᶜ. The bar carries at its upper end a rack 41ᵇ engaging a gear 42 adapted to control the movement of the presser rollers 31.

To this end each pair of said rollers is carried by a yoke or head on the end of a piston rod 43 sliding in a stuffing box in the end of cylinder 44 and having a suitable piston 43ª therein.

Cylinder 44 has pipes 45 and 46 leading therefrom to a valve chamber 47 carried by cylinder bracket 44ˣ having ports connected respectively to a source of compressed air (not shown) and the atmosphere, and controlled by a four way cock 47ˣ connected to be rotated by gear 42 under the action of rack 41ᵇ.

Figure 7:
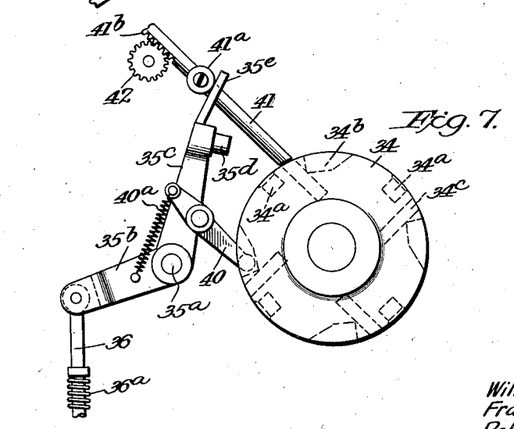
Fig. 7 is a detail view of the control disc and cooperating parts.

Pressure on treadle 39 causes the bell crank 35 to move into the position shown in Fig. 7 which lifts dog 41 out of its recess and at the same time causes the roller on the end of pawl 40 to drop into one of the ratchet recesses 34ᵇ. Upward movement of arm 35ª causes fork 35ᵉ to connect with roller 41ª thus lifting rod 41 against the pressure of spring 41ˣ until its lower end clears the recess in the disc 34 at which time the parts are in the position shown in said Fig. 7. Upward movement of rod 41 to the position designated through the rack and gear connection, turns the four way cock to admit pressure fluid through pipe 46 to the inner end of the cylinder 44 which raises the rollers 31 out of the path of the mandrel.

Releasing the treadle 39 allows rod 36 to rise under the influence of the spring 36ª which rocks the bell crank lever in a clockwise direction causing pawl 40 to impart to disc 34 a quarter rotation. The lower end of rod 41 during each rotation rides on the surface of the disc retaining the four way valve in the aforesaid position until the next succeeding recess 34ᶜ is reached at which time rod 41 under influence of spring 41ˣ enters said recess and locking dog 35ᵈ enters the corresponding recess 34ª whereby the disc is locked against movement.

During this quarter rotation of the discs 34 (described in the singular for convenience) the mandrel has been carried from position F to position G at which time it clears the ends of the guides 33.

The inward movement of rack 41ᵇ reverses the four way valve and admits pressure fluid to the outer end of the cylinder through pipe 45 while its inner end is connected to the atmosphere for exhaust, which causes the piston to be moved inward and rollers 31 to contact with the mandrel ends and force them into contact with the rotating friction or drive and supporting wheels or discs 31 whereby the mandrel is rotated. During each rotation the fabric or wrapping strip is fed to the mandrel and wound helically thereon by any suitable means, which as it forms no part of the present invention, is not herein shown and described. It could in fact, if desired, be done by hand.

Figure 2:
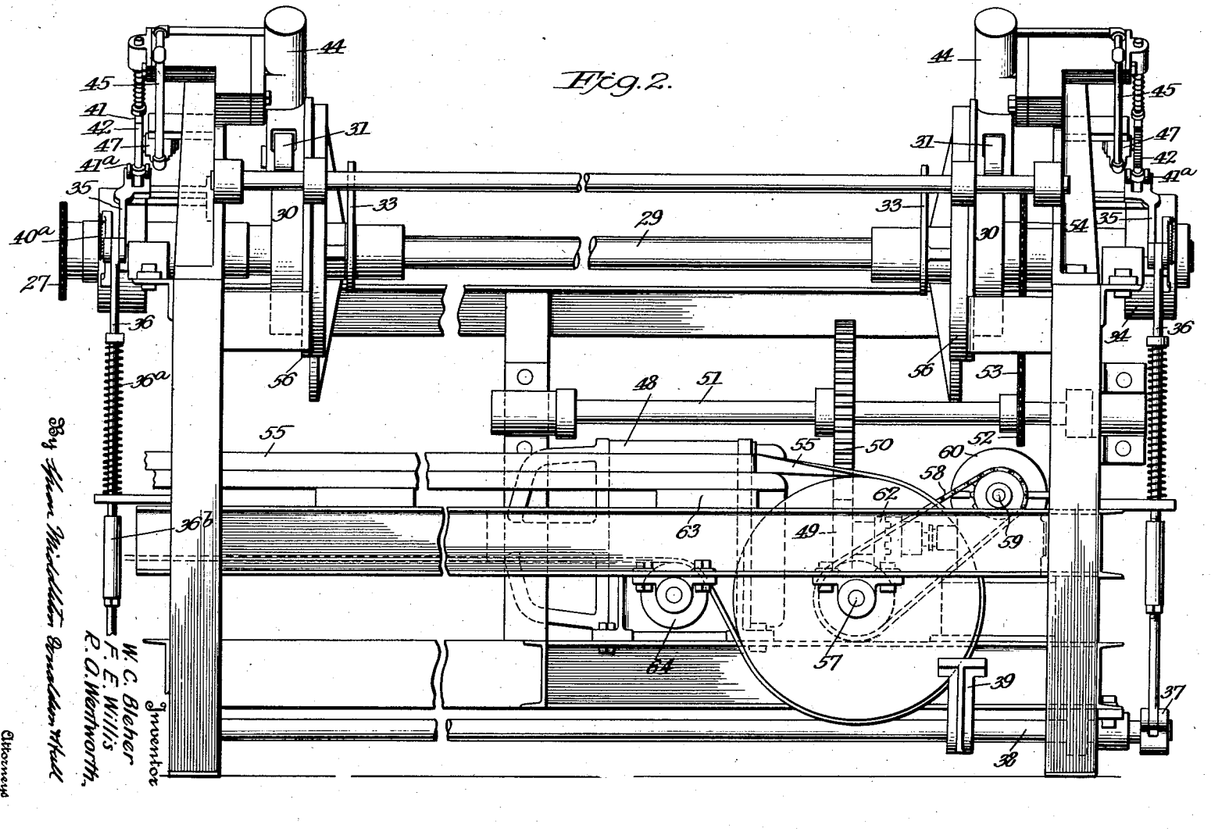
Fig. 2 is a side elevation as viewed from the left, Fig. 1.
Figure 8:
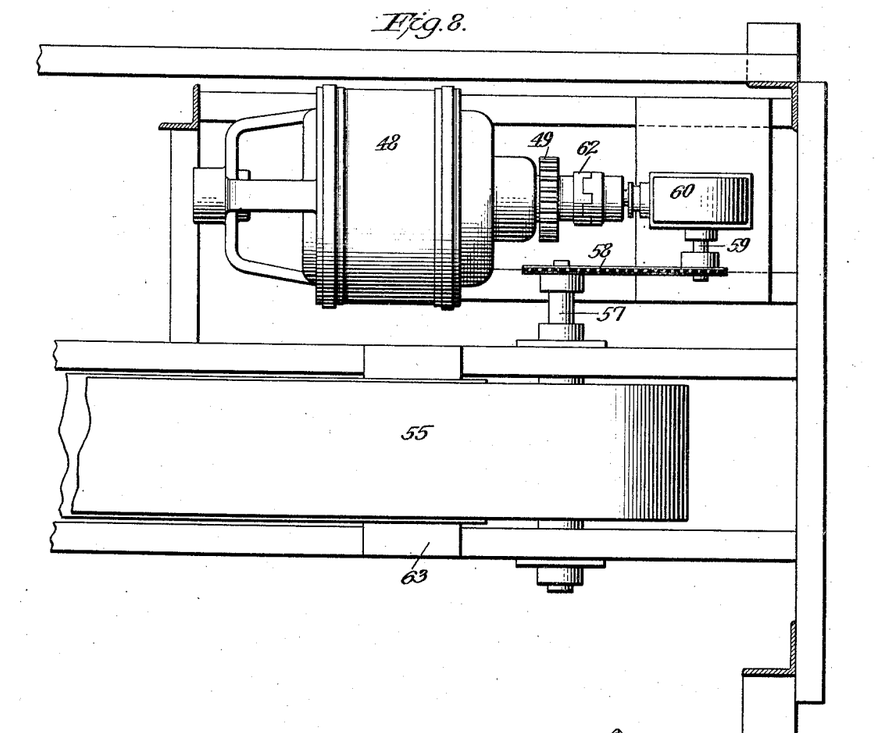
Fig. 8 is a detailed plan view of the motor and conveyor belt with parts broken away.
Figures 9, 10:
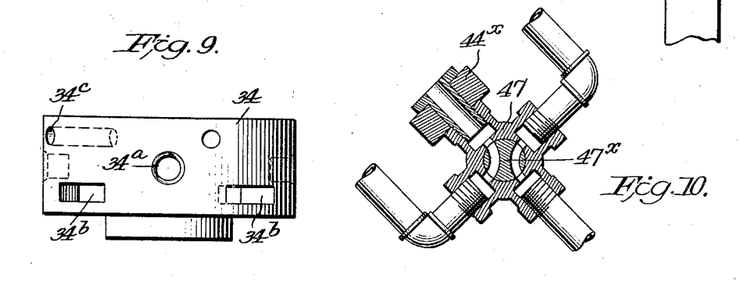
Fig. 9 is a detail plan view of the control disc of Fig. 7.
Fig. 10 is a sectional detail view of the four-way cock.

It will be understood that in the embodiment shown only the right hand friction wheel is driven, the left hand one 30 being an idle wheel or disc and serving as a rotatable support only. This driving is effected in the following manner. The shaft of motor 48 (Fig. 8) has fast thereon a gear 49 which meshes with a gear 50 (Fig. 2) fast on counter shaft 51. This in turn carries a sprocket 52, the chain 53 of which passes around a sprocket 54, fast on the sleeve or hub of wheel or disc 30.

After a tube on a mandrel has been wrapped the next quarter turn of the conveying members 32 brings the wrapped tube and mandrel from wrapping position G to delivery position J where it is deposited on an endless conveyor 55 and conveyed to any desired point. While moving from position G to delivery point J the mandrels are retained in the recesses 32ª by curved guides 56.

Conveyor 55 passes around a drive pulley at one end fast on shaft 57 (Fig. 8) which is driven by chain and sprocket connections 58 from a shaft 59 which in turn is driven by worm gearing 60 from shaft 65 connected to the motor shaft through a suitable flexible coupling 62.

The upper run of the belt 55 passes over slider supports 63 having a curved upper surface (only one being shown) by which it is held in trough shape. The lower run passes over idle pulleys 64 by which it is held up from the floor, and it may be extended to any suitable point of delivery where it passes around an idle pulley (not shown).

While we have described our invention with considerable particularity in order that the same may be clearly understood it will be evident that various changes and modifications could be made without departing from the spirit of our invention.

Having thus described our invention what we claim is:—

1. In apparatus of the class described, a pair of rotatable mandrel supporting and rotating wheels, means for driving at least one of said wheels, means for intermittently feeding the mandrels to position their end portions adjacent the peripheries of said wheels, presser rolls for pressing the mandrel ends against said wheel peripheries, and means for moving said presser rolls towards and from said wheels.

2. In apparatus of the class described, a pair of rotatable mandrel supporting and rotating wheels, means for driving at least one of said wheels, a pair of mandrel positioning discs rotatable about axes coincident with said wheels and adjacent thereto, said discs having spaced apart mandrel end receiving recesses in their peripheries, of a depth sufficient to allow the mandrel ends to contact with the wheel peripheries, means for intermittently rotating said discs, means for feeding mandrels to the recesses in said discs in one position, curved guides for holding the mandrel ends out of contact with said wheels for a determined distance, presser rolls positioned to press the mandrel ends against the wheels after they leave said guides, and means for moving said presser rolls towards and from the said wheels.

3. Apparatus according to claim 2 in which a mandrel receiving conveyor is positioned below the discs, and curved guides are provided for retaining the mandrels in the recesses until they reach a position over said conveyor.

4. Apparatus according to claim 2 in which pawl and ratchet mechanism is provided for intermittently rotating the discs, and locking dogs for locking said discs in proper position.

5. Apparatus according to claim 2 in which double acting fluid pressure cylinders are provided having piston rods operatively connected to said pressure rollers.

6. Apparatus according to claim 2 in which double acting fluid pressure cylinders are provided having pistons with piston rods operatively connected to the presser rollers and valve means is provided for controlling the admission of pressure fluid to and its exhaust from said cylinders, there being a slidable rod operatively connected to each valve and having its end adapted to successively enter spaced recesses in the discs, and means whereby said rod is operated in unison with said pawl and ratchet mechanism.

7. In apparatus of the class described, a pair of rotatable mandrel supporting and rotating wheels, means for driving at least one of said wheels, a pair of mandrel positioning discs rotatable about axes coincident with said wheels, and adjacent thereto, said discs having spaced apart mandrel end receiving recesses of a depth sufficient to allow the mandrel ends to contact with the peripheries of said wheels, means for intermittently rotating said discs, means for feeding mandrels into said recesses when in one position, guides for holding the mandrel ends out of contact with the wheel peripheries for a determined distance, presser rolls for pressing said mandrels against the wheel peripheries when free from said guides, and fluid pressure means for moving said pressure rolls towards and from the said wheels.

8. In apparatus of the class described, a pair of rotatable mandrel supporting and rotating wheels, means for driving at least one of said wheels, a pair of mandrel positioning discs rotatable about axes coincident with said wheels, and adjacent thereto, said discs having spaced apart mandrel end receiving recesses of a depth sufficient to allow the mandrel ends to contact with the peripheries of said wheels, means for intermittently rotating said discs, means for feeding mandrels into said recesses when in one position, guides for holding the mandrel ends out of contact with the wheel peripheries for a determined distance, presser rolls for pressing said mandrels against the wheel peripheries when free from said guides, and fluid pressure means for moving said presser rolls towards and from the mandrels, and means whereby said fluid pressure means is automatically controlled in unison with the intermittent movement of the discs.

9. Apparatus according to claim 7 in which the means for imparting intermittent rotation to the discs comprises a rocking lever having a pawl for engaging ratchet abutments on the disc, and a rod is provided actuated by said rocking lever and operatively connected to control said fluid pressure means.

10. In apparatus of the class described, a pair of rotatable mandrel supporting and rotating wheels, means for driving at least one of said wheels, a pair of mandrel positioning discs rotatable about axes coincident with said wheels, and having mandrel end receiving recesses of a depth sufficient to allow contact of the mandrel ends with said wheels, guides for holding the mandrel ends out of contact with the wheels for a determined distance, presser rolls for acting on the mandrel ends adjacent the termini of the guides, means for intermittently rotating the discs, and means for moving the presser rolls towards and from the wheels.

11. In apparatus of the class described, a pair of rotatable mandrel supporting and rotating wheels, means for driving at least one of said wheels, a pair of mandrel positioning discs rotatable about axes coincident with said wheels, and having mandrel end receiving recesses of a depth sufficient to allow contact of the mandrel ends with said wheels, guides for holding the mandrel ends out of contact with the wheels for a determined distance, presser rolls for acting on the mandrel ends adjacent the termini of the guides, pawl and ratchet mechanism for intermittently rotating said discs, means controlled by said pawl and ratchet mechanism for moving said presser rolls towards and from the drive wheels, and means for preventing movement of the rolls towards the drive wheels until the discs have been moved to a predetermined position.

12. In apparatus of the class described, a pair of rotatable mandrel supporting and rotating wheels, means for driving at least one of said wheels, a pair of mandrel positioning discs rotatable about axes coincident with said wheels, and having mandrel end receiving recesses of a depth sufficient to allow contact of the mandrel ends with said wheels, guides for holding the mandrel ends out of contact with the wheels for a determined distance, presser rolls for acting on the mandrel ends adjacent the termini of the guides, cylindrical ratchet members operatively connected with said discs having ratchet abutments, pawl means for engaging said abutments to intermittently rotate said members and discs, presser rolls mounted to move towards and from the drive wheels, fluid pressure means for moving said rolls towards and from the drive wheels, valve means for controlling said fluid pressure means, reciprocating rods operatively connected to said guide means and normally pressed towards said cylindric ratchet members, and means whereby operation of said pawl means to rotate said ratchet members moves said rods away from members, said rods having ends adapted to ride on the cylindric surface of said ratchet members and said members having recesses to permit entrance of the rods to reverse the valve means.

13. In apparatus of the class described, a pair of mandrel rotating wheels, means for driving at least one of said wheels, a pair of mandrel positioning discs rotatable about axes coincident with said wheels and having mandrel receiving recesses of a depth sufficient to allow contact of the mandrels with said wheels, guides for holding the mandrels from contact with the wheels for a determined distance, means for intermittently rotating said discs including cylindric members connected with said discs and having ratchet abutments, rocking levers having pawls cooperating with said abutments, presser rolls mounted to move towards and from the wheels, double acting fluid pressure means for operating said presser rolls, valve means for controlling said fluid presser means, rods operatively connected with said valve means and normally spring pressed towards said ratchet members, said ratchet members having cylindric surfaces on which the ends of said rods can ride and having rod end receiving recesses, said rocking levers having parts coacting with abutments on the rods to move them away from said ratchet members.

14. In apparatus of the class described, a pair of mandrel rotating wheels, means for driving at least one of said wheels, a pair of mandrel positioning discs rotatable about axes coincident with said wheels and having mandrel receiving recesses of a depth sufficient to allow contact of the mandrels with said wheels, guides for holding the mandrels from contact with the wheels for a determined distance, means for intermittently rotating said discs including cylindric members connected with said discs and having ratchet abutments, rocking levers having pawls cooperating with said abutments, presser rolls mounted to move towards and from the wheels, double acting fluid pressure means for operating said presser rolls, valve means for controlling said fluid presser means, rods operatively connected with said valve means and normally spring pressed towards said ratchet members, said ratchet members having cylindric surfaces on which the ends of said rods can ride and having rod end receiving recesses, said rocking levers having parts coacting with abutments on the rods to move them away from said ratchet members, said rocking levers having locking dogs and said ratchet member recesses to receive said dogs.

15. In apparatus of the class described, a pair of mandrel rotating wheels, means for driving at least one of said wheels, a pair of mandrel positioning discs rotatable about axes coincident with the axis of said wheels, and having spaced apart mandrel receiving recesses in their peripheries of a depth sufficient to permit the mandrels to contact with the discs, guides for holding the mandrels from contact with the discs for a determined distance, means for intermittently rotating said discs, inclined guide means for supporting mandrels and feeding them by gravity to the recesses in said disks, and separator means carried by said guides and adapted to hold back the mandrels on said guides and release them one at a time, and means for operating said separator means.

16. In apparatus of the class described a pair of rotatable mandrel supporting and rotating wheels, means for driving at least one of said wheels, means for feeding tube bearing mandrels to position their uncovered ends adjacent the peripheries of said wheels, and means for pressing said mandrel ends into frictional contact with the peripheries of said wheels.

In testimony whereof, we affix our signatures.

WILLIAM C. BLEHER.
FRANK E. WILLIS.
ROLAND A. WENTWORTH.